United States Patent Office 2,727,933
Patented Dec. 20, 1955

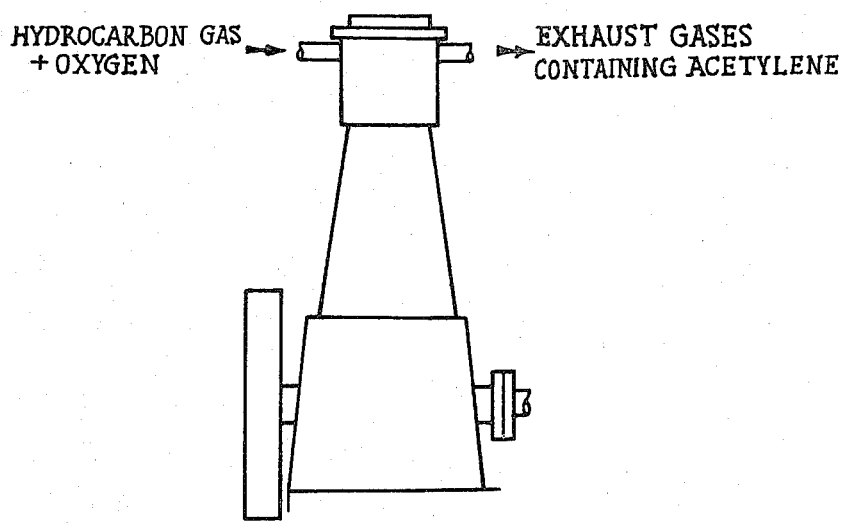

2,727,933

PARTIAL OXIDATION AND PYROLYSIS OF SATURATED HYDROCARBONS

Edgar Charles Evans, Stanmore, and Hugh Ford and Nolan Peter William Moore, London, England, assignors to National Research Development Corporation, London, England, a British company Application October 2, 1950, Serial No. 187,912

Claims priority, application Great Britain October 4, 1949

3 Claims. (Cl. 260—679)

This invention is for improvements in or relating to the partial oxidation and pyrolysis of saturated hydrocarbons and has for an object to provide an improved process, inter alia, for the production of acetylene by the dehydrogenation of hydrocarbons.

Known processes of producing acetylene from hydrocarbons such as methane, ethane and ethylene are based on the dehydrogenation of hydrocarbons by:

(1) Arc process,
(2) Cracking processes, and
(3) Partial combustion processes.

In all three processes the fundamental consideration is the heating of the hydrocarbon to a sufficiently high temperature (methane, for example, requires 1500° C., ethane 1300° C.) coupled with the fact that the time at which this high temperature should be maintained must be as short as possible to avoid the decomposition or further reaction of the acetylene thus produced to carbon black and hydrogen or other intermediate product. The partial pressure of the acetylene should also be kept as low as possible in relation to the initial pressure whilst the gas, after its formation, should be cooled as rapidly as possible.

All these processes suffer from the disadvantage that power and/or energy consumption is extremely high. The arc process, for example, requires on an average about 4½ kilowatt hours per lb. of acetylene produced, a consumption of the same order as that required for acetylene production from carbide.

Cracking processes require considerable heat energy which is generally obtained by the combustion of the by-product gases, whilst the high temperatures required for acetylene production introduce serious refractory problems, particularly when methane is used.

The third process of partial combustion requires the use of oxygen in order to obtain the necessary high flame temperature and needs very accurate control. Approximately 5 tons of oxygen are usually required by this process for the production of 1 ton of acetylene which, of course, adds considerably to the cost of operation. The by-product gases from the combustion process, however, consist largely of carbon monoxide and hydrogen which can be produced in such proportions as to allow of their use for the manufacture of methyl alcohol.

According to the present invention there is provided a process for the partial oxidation and/or pyrolysis or cracking of organic substances which comprises feeding said organic substance, together with molecular oxygen, e. g. air, oxygen or air enriched with oxygen, into the combustion chamber of an internal combustion engine and regulating the conditions within said combustion chamber during the engine cycle to effect the desired conversion of the organic substance and to preserve the products of said conversion against undesired degradation or further conversion.

One of the advantages of this process for the conversion of organic substances is that positive work may be obtained from the engine.

The regulation of conditions within the combustion chamber can be effected in a variety of different ways taken either separately or in any combination. Thus, the regulation of conditions may be effected, at least in part, by controlling the composition and/or condition of the charge introduced into said combustion chamber prior to ignition thereof or it may be effected, at least in part, by controlling the composition and/or conditions of the charge in said combustion chamber at or subsequently to the ignition thereof. Moreover, the regulation of conditions may be effected by controlling the point in the engine cycle at which ignition takes place, or alternatively, by controlling the point in the engine cycle at which the combusted, partially combusted or combusting charge or a desired proportion of such charge is removed from the combustion chamber.

In this connection it may be desirable to introduce, at certain stages in the cycle, modifying substances i. e. chemical substances of such a nature that they will themselves influence the rate and extent and, in certain cases, the nature of the chemical reactions or influence the range of composition of the reacting mixtures which can support active combustion. For example, it is known that minute traces of ethylene dibromide have the power of arresting active combustion of a methane-air mixture.

The various conditions obtaining within the combustion chamber may be regulated by controlling the inlet conditions of the charge induced or introduced to the combustion chamber, for example, by controlling the temperature, pressure and composition of the charge, whilst furthermore the compression ratio and the degree of expansion of the combusted charge may be controlled. Furthermore, if required, the entire operation of the engine cycle may be effected at pressures lower than are normal in internal combustion engines, for example, by the use of an exhauster associated with the exhaust of the internal combustion piston engine, the exhauster being either directly coupled to the engine or driven by external means. By coupling the exhauster directly to the engine, the power required is derived from the combustion taking place within the combustion chamber.

A further means of regulating or controlling the pressure-volume-time relationship in the cycle is by operating the piston of the internal combustion engine by a mechanism other than the simple crank and connecting rod mechanism, an example of which would be one or other form of known quick-return motion mechanism so as to give a relatively slow compression stroke and a rapid expansion stroke.

It will be appreciated that the high temperatures required for the dehydrogenation or other conversion of the organic substances are achieved partially by the effect of compression during the compression stroke and partially by the temperature of the partial combustion taking place during the early stages of the working stroke of the internal combustion piston engine, whilst the necessary rapid lowering of the temperature results from the adiabatic expansion of the gases occurring during the later stages of the working expansion stroke and the exhaust stroke. If desired or necessary, the combustion products may be subjected to a further cooling after having been exhausted from the engine by means of a quenching spray which may, for example, either be water or it may be a solvent, such as acetone, which is capable of selectively dissolving acetylene from the exhaust products.

After removal of the desired partial oxidation, pyrolysis or cracking products, the remaining gaseous mixture can either be recycled to the engine in admixture with further quantities of the organic substance and molecular oxygen, or it can be burnt, after dilution with secondary air, in an internal combustion engine or gas turbine, or further, the remaining gaseous products may be used for chemical synthesis, or as a fuel.

A feature of the invention consists in that a preliminary charge of an easily ignitable fuel is ignited in the combustion chamber and the organic substance to be converted is introduced into the combustion chamber, at least in part, during or after the ignition of said preliminary charge; if desired, additional organic substances, for example methane or ethane or a liquid fuel, could be introduced into the combustion chamber, either homogeneously or in a localised region so as to form a very rich mixture in that region, after ignition of an original charge of the same or another substance had taken place; for example, the additional hydrocarbon could be injected into the combusting gases in the combustion chamber under pressure. The ignition of the original charge can be effected by means of a spark or other suitable source or sources of heat or by the heat of compression of the charge itself as in a compression-ignition engine.

A suitable means of introducing or removing part of or the whole charge is with a sleeve valve mechanism, the ports of which are so shaped or dimensioned as to meter the charge into or out of the combustion space by means of the pressure difference across the ports and the time in which the port is in communication with the combustion space.

In order to secure the maximum yield in the partial oxidation (i. e. dehydrogenation) of hydrocarbons, it may be necessary to use rich mixtures for introduction into the combustion chamber or engine and, in order to stabilise the combustion of such rich mixtures, it may be desirable to achieve stratification of the ingoing charge.

The invention has been carried into effect in the production of acetylene by partial combustion of methane in a single cylinder variable compression spark ignition engine. The engine used was a Ricardo E.6 Experimental Engine having a bore of three inches and a stroke of four and three-eighths inches and having an adjustable cylinder head providing a range of compression ratios from 5.5 to 1 to 18 to 1, the engine being capable of running at speeds up to 3,000 revolutions per minute.

The engine has been operated under a wide variety of running conditions using both air and oxygen in admixture with excess methane. For instance, the process has been carried out using a wide range of engine speeds and it has been established that the higher yields of acetylene are obtainable at the higher engine speeds. That is to say that the yield of acetylene increased with an increase of engine speed up to the maximum speed of the engine namely 3,000 revolutions per minute.

The engine has been operated with varying compression ratios and it has been further established that the yield of acetylene increases as the compression ratio is reduced down to the minimum ratio obtainable on the engine, namely 5.5 to 1.

It has also been established that, over a wide range of methane-air or methane-oxygen mixtures, the engine will operate stably, i. e. will continue with a steady rate of production of acetylene; for example, the engine will operate stably with methane-oxygen mixtures containing as much as 200% by volume excess of methane over the amount stoichiometrically equivalent to the oxygen in the mixture. The yields of acetylene are improved, however, if an inert diluent gas is present in the mixture, for example nitrogen, as was established by the higher yields obtainable with methane-air mixtures containing up to a 50% by volume excess of methane; the reason for this result is apparently to be found in the reduced partial pressures of the hydrocarbon gases in the mixture, a conclusion which is supported by the higher yields obtainable at the lower compression ratio in the engine.

The partial pressure of the hydrocarbon or of its decomposition products can be reduced during the dehydrogenation process by the introduction of a dilutant, such as nitrogen or carbon dioxide, into the combustion space at any desired stage.

Since the partial oxidation, pyrolysis and cracking processes are liable to be affected by various metals and generally are sensitive to catalysis, the surfaces of the combustion chamber and other surfaces in the engine where the hot gases come into contact with the metals, are preferably made of special steel or other metal surfaces which will minimise the formation of carbon and which will not catalytically interfere with the desired conversions and, indeed, metal may be used which can catalytically assist in the dehydrogenation of hydrocarbons to acetylene.

In prior British Patent No. 619,634 there is described the application of what is termed "sweat cooling" to intensely heated surfaces. The prior invention concerns the formation of porous layers on the heated surfaces through which a cooling fluid can be caused to flow under the necessary pressure to ensure that the cooled fluid percolates through the pores and reaches the surface and comes into contact with the hot gases flowing over the surfaces.

The present invention can conveniently embody the "sweat cooling" invention of the prior patent and, accordingly, it is a feature of the invention that the surfaces of the combustion chamber are formed, e. g. by means of powder metallurgy methods, with a porous structure and a liquid or gas is forced through the porous structure to effect "sweat cooling" of the combustion chamber surfaces and/or to limit undesirable surface reactions and deposition of solid on said surfaces, by the provision of a layer of gas through which the reacting molecules would have to diffuse to reach the surface.

It will be appreciated that, by variation in the regulation of the conditions under which the internal combustion piston engine operates, a wide degree of control of the partial oxidation, pyrolysis or cracking processes can be secured whereby an accurate control of combustion may be achieved which leads not only to high yields of the desired product, e. g. acetylene, but also enables the recovery of a considerable proportion of the energy produced in the combustion in the form of mechanical work; the process, moreover, permits the recovery of carbon black from the exhausted gases.

The accompanying diagrammatic drawing illustrates schematically how the process may be carried into effect in an internal combustion engine.

We claim:

1. In a process for the pyrolysis of hydrocarbons within an internal combustion engine in which the hydrocarbon is fed as the fuel into the combustion chamber in which heat is supplied by combustion of part of said fuel, supplying said hydrocarbon into said combustion chamber by induction together with substantially pure oxygen in an amount sufficient to react with only a small proportion of said hydrocarbon and produce a pyrolyzed product, said hydrocarbon-oxygen mixture being substantially free from inert diluents, and adiabatically expanding said product of the pyrolysis within said combustion chamber to preserve said product from undesired degradation and to cool said product to a temperature at which said degradation is substantially prevented.

2. In a process for the pyrolysis of saturated gaseous hydrocarbons to substantially unsaturated hydrocarbons in the combustion chamber of an internal combustion reciprocating piston-type engine, comprising feeding the saturated hydrocarbon together with molecular oxygen into the combustion chamber wherein the amount of hydrocarbon employed is far in excess of that required for complete combustion of the saturated hydrocarbon relative to the amount of oxygen fed into the combustion chamber and heating the mixture of hydrocarbon and oxygen in the combustion chamber to a sufficiently high temperature to initiate the conversion of the saturated hydrocarbon into gaseous unsaturated hydrocarbon, that improvement comprising providing the energy for the endothermic heat of cracking by the combustion of part of the charge with a great deficiency of oxygen within said engine, said combustion of the fuel-rich charge initiated by the ignition resulting from the injection of an easily ignitible fuel, and conducting substantially the entire rapid cooling of the gaseous reacting mixture by adiabatic expansion within said engine, said rapid cooling preventing further undesired conversion of the gaseous unsaturated hydrocarbons produced.

3. A process as in claim 2 wherein the said saturated hydrocarbon is methane and acetylene is produced.

References Cited in the file of this patent

UNITED STATES PATENTS

| | | |
|---|---|---|
| 1,880,310 | Wulff | Oct. 4, 1932 |
| 1,939,018 | Odell | Dec. 12, 1933 |
| 1,966,779 | Wulff | July 17, 1934 |
| 2,145,250 | Dillstrom | Jan. 31, 1939 |
| 2,234,900 | Jones | Mar. 11, 1941 |
| 2,377,847 | Allen et al. | June 12, 1945 |
| 2,500,510 | Barnes | Mar. 14, 1950 |

FOREIGN PATENTS

| | | |
|---|---|---|
| 619,634 | Great Britain | Mar. 11, 1949 |
| 453,084 | Great Britain | Nov. 2, 1935 |